(12) United States Patent
Nakashima

(10) Patent No.: US 6,647,143 B1
(45) Date of Patent: Nov. 11, 2003

(54) METHOD AND DEVICE OF COMPRESSING DIGITAL IMAGE DATA

(75) Inventor: Shoji Nakashima, Tokyo (JP)

(73) Assignee: NEC Electronics Corporation (JP)

( * ) Notice: Subject to any disclaimer, the term of this patent is extended or adjusted under 35 U.S.C. 154(b) by 529 days.

(21) Appl. No.: 09/667,448

(22) Filed: Sep. 22, 2000

(30) Foreign Application Priority Data

Sep. 24, 1999 (JP) .......................................... 11-270975

(51) Int. Cl.[7] .............................. G06K 9/00; G06K 9/36
(52) U.S. Cl. ...................... 382/166; 382/253; 382/233
(58) Field of Search ................................ 382/166, 251, 382/253, 233; 375/240.22; 348/420.1, 421.1, 422.1; 345/600, 601, 602

(56) References Cited

U.S. PATENT DOCUMENTS

| | | | | |
|---|---|---|---|---|
| 5,319,793 A | * | 6/1994 | Hancock et al. | 345/602 |
| 5,412,766 A | * | 5/1995 | Pietras et al. | 345/602 |
| 5,463,702 A | * | 10/1995 | Trueblood | 382/239 |
| 5,684,895 A | | 11/1997 | Harrington | |
| 5,734,744 A | * | 3/1998 | Wittenstein et al. | 382/166 |
| 6,518,981 B2 | * | 2/2003 | Zhao et al. | 345/601 |

FOREIGN PATENT DOCUMENTS

EP   0907294   4/1999

OTHER PUBLICATIONS

European Search Report dated Nov. 6, 2002.

* cited by examiner

Primary Examiner—Phuoc Tran
(74) Attorney, Agent, or Firm—Dickstein, Shapiro, Morin & Oshinsky, LLP.

(57) ABSTRACT

A method and device of compressing a digital image are provided. The method firstly divide pixels in the image into entries, then representative color information of the entries are determined and the entries are rearranged in order of the information. Herein, the rearranged entries are grouped into some group entries, and average color information is determined for each group entry. Finally, location information and the average color information of the entries are stored as compressed image.

14 Claims, 12 Drawing Sheets

| α1 | γ1 | α2 | γ2 | α3 | γ3 | | α15 | γ15 | α16 | γ16 |
|----|----|----|----|----|----|----|-----|-----|-----|-----|
| β1 | δ1 | β2 | δ2 | β3 | δ3 | | β15 | δ15 | β16 | δ16 |

METHOD AND DEVICE OF COMPRESSING DIGITAL IMAGE DATA

BACKGROUND OF THE INVENTION

1. Field of the Invention

The invention relates to a method and a device of compressing digital image data, in particular, to a compressing method which is capable of improving a quality of decompressed digital image data without decreasing a compression ratio.

2. Description of the Related Art

An image compressing method, such as a method, of using vector quantization is advantageous in that a circuit of inverse transformation (expansion) can be simplified, as compared with a compressing method, such as a method used for JPEG. The method used for JPEG divides an image into a plurality of blocks each of which includes pixels and quantizes discrete cosine transform (DCT) coefficients resulting from DCT of the blocks into quantized data. The quantized data is encoded into a variable-length code.

Therefore, the image compressing method using vector quantization is generally used when a texture image is compressed by a three dimension image processing LSI. However, because the compression process is irreversible, there is a limit to increase a compression ratio with maintaining a quality of the image to a certain extent.

A previous method of compressing an image firstly divides a plurality of small area (thereafter, referred to as "entry") including some pixels of an original image. Then, color data including colors of each pixel in the entry are added to an area "code book" for each entry.

But, if it is determined that color data of pixels in an entry are the same as color data already stored in the code book, the same color data are not added.

Each entry is related to both the corresponding color data and location data which represent a location of the entry. As described above, since the same color data are not added, the original image is consequently compressed at a compression ratio.

However, in the method, the numbers of color data which are stored in the code book depends on a volume of a memory available for the code book.

Furthermore, in the method, since it is required that the number of pixels of an original image is increased with a quality of the compressed image kept to the same extent, a large number of entries are required. Therefore, to maintain a repeatability of the original image in this case, a memory must have a large memory capacity and thereby a compression ratio of the image can be decreased.

Also, in the method, the same compressing scheme is used both when each of consecutive entries of the original image has similar colors and when a color of a pixel in an area is completely different from a color of the adjacent pixel. Therefore, to improve a repeatability of an area of the original image where color is frequently changed, a volume of the code book required for compressing must be increased.

SUMMARY OF THE INVENTION

Therefore, it is an object of the invention to provide a method and a device of compressing digital image data. The method and the device provide an improved quality of decompressed image data without decreasing a compression ratio of the image data.

The method and the device, to achieve the above effect, rearrange the entries each of which includes some pixels on the basis of the color data and then, performs averaging process of the color data among some entries.

Further, it is an object of the invention to provide a method and a device, which omit the averaging process for an image area in which a priority mask is given. Thereby, it is possible to increase a resolution of an area of the image where a color is drastically changed, for example a color is changed for each pixel.

According to a first aspect of the invention, there is provided a method of compressing an image including a plurality of pixels. The method comprises the steps of dividing the plurality of pixels into a plurality of entries, computing representative color information of each entry using color information of pixels in the entry, rearranging the entries in order of the representative color information, grouping the rearranged entries into a plurality of group entries, averaging color information for each group entry by averaging color information of pixels in the group entry, storing the average color information for each group entry, and storing location information representing a location of the entry on the image and an address where the average color information corresponding to the entry is stored.

According to a second aspect of the invention, there is provided a device of compressing an image including a plurality of pixels. The device comprises an input image storage which input the image and stores color information which represents color of pixels of the image, an image division unit which divides the plurality of pixels into a plurality of entries, an entry sort unit which computes representative color information of each entry using the color information of pixels in the entry and rearranges the entries in order of the representative color information, an entry grouping unit which groups the rearranged entries into a plurality of group entries, an average unit which averages color information for each group entry by averaging color information of pixels in the group entry, an average color information storage which stores the average color information for each group entry, and an index which stores location information representing a location of the entry on the image and an address where the average color information corresponding to the entry is stored.

According to a third aspect of the invention, there is provided a recording medium readable by a computer, tangibly embodying a program of instructions executable by the computer to perform a method of compressing an image including a plurality of pixels. The method comprises the steps of dividing the plurality of pixels into a plurality of entries, computing representative color information of each entry using color information of pixels in the entry, the color information representing a color of the pixel, rearranging the entries in order of the representative color information, grouping the rearranged entries into a plurality of group entries, averaging color information for each group entry by averaging color information of pixels in the group entry, storing the average color information for each group entry, and storing location information representing a location of the entry on the image and an address where the average color information corresponding to the entry is stored.

DESCRIPTION OF THE PREFERRED EMBODIMENT

Figure 1:
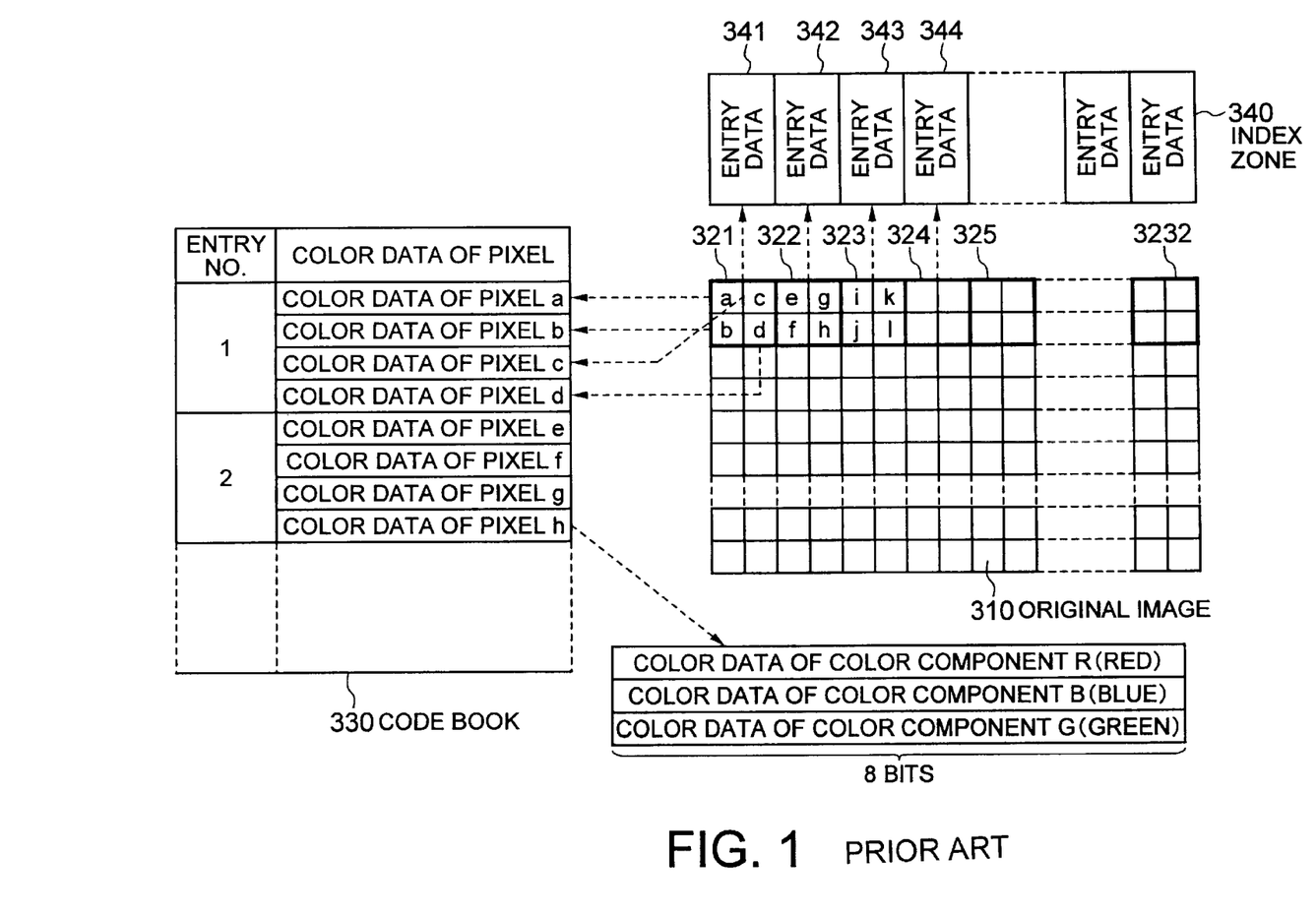
FIG. 1 shows a diagram representing a previous method of compressing digital image data using vector quantization.

At first, description will be made about a previous method of compressing digital image data with reference to FIG. 1.

In the previous method, an original image 310 is, for example, divided into a plurality of small areas (entries) 321 and 3232 each of which consists of four pixels (two pixels by two pixels). Herein, the entry 321 is assumed to be composed of four pixels a, b, c, and d, and similarly, the entry 322 is assumed to be composed of four pixels e, f, g, and h. Each pixel can be represented by color data of three color (namely, chrominance) components R (red), G (green), and B (blue) each of which is represented by eight bits values (0–255 level (chrominance levels)). Hereinafter, these values about three color components of a pixel or three color components of pixels in an entry are collectively referred to as "color data".

Next, the method stores color data of the entry 321 including pixels a to d into an area in a code book 330 having entry number "1", and stores location data representing a location of the entry 321 and the entry number (that is, "1") into an index zone 340 as entry data 341.

Then, the method compares color data of the entry 322 including pixels e to h with the color data (namely, the color data of the entry 321) stored in the area of entry number "1" in the code book. In this case, even if the color data of the entry 322 and the color data of the entry 321 are not strictly coincident with each other, it can be considered that color data of the two entries are identical with each other when a difference value of the color data of the two entries falls within a certain range.

Herein, the comparison of the color data of the two entries is achieved in the way of comparing pairs of two corresponding pixels in the two entries, that is, pixels a and e, pixels b and f, pixels c and g, and pixels d and h. When the pairs of pixels are all coincident, the color data of the entry 321 and the color data of the entry 322 are coincident. But, when at least one pair of pixels is coincident, it may be determined that the color data of the entry 321 and the color data of the entry 322 are different from each other.

When the color data of the entry 321 and the color data of the entry 322 are different from each other, the color data of the entry 322 (pixels e to h) are stored into an area of entry number "2" in the code book 330, and location data of the entry 322 and the entry number (that is, "2") are stored in the index zone 340 as entry data 342.

Likewise, comparison is made between the entry 323 and the entry 321 and between the entry 323 and the entry 322. If the color data of the entry 323 and the color data of the entry 321 are coincident with each other, the color data of the entry 323 are not stored into the code book 330, and location data of the entry 323 and the entry number (that is, "1") are stored in the index zone 340 as entry data 343.

Thus, the color data of an entry 32J (J is an integer between 1 to 32, both inclusive) are successively compared with the color data in the code book 330 one after another. When it is determined that the color data of the entry 32J and any of the color data in the code book 330 are different from one another, the color data of the entry 32J are stored into the code book 330.

As described above, the previous compressing method using vector quantization can compress the original image data 310 since the original image data 310 are stored as the code book 330 and the index zone 340.

For example, it is assumed that the original image data 310 include 128 pixels by 128 pixels, each pixel is represented by RGB colors each of which further represented by eight bits. In addition, it is also assumed that each of the entries (321, 322, . . . ) is composed of four pixels, and that each of the entry data in the index zone 340 is composed of eight bits. In this case, a size of the original image data 310 (before compression) is 49,152 bytes (=128×128×3×8 bits). On the other hand, a size of the index zone 340 of the compressed image data becomes 4,096 bytes ((128×128/4)×8 bits). Therefore, the compressed image data can be compressed to about eight percent of the original image data size.

However, in this method, as described above, the number of entries which is stored in the code book 330 depends on a volume of a memory available for the code book 330.

Figure 2:
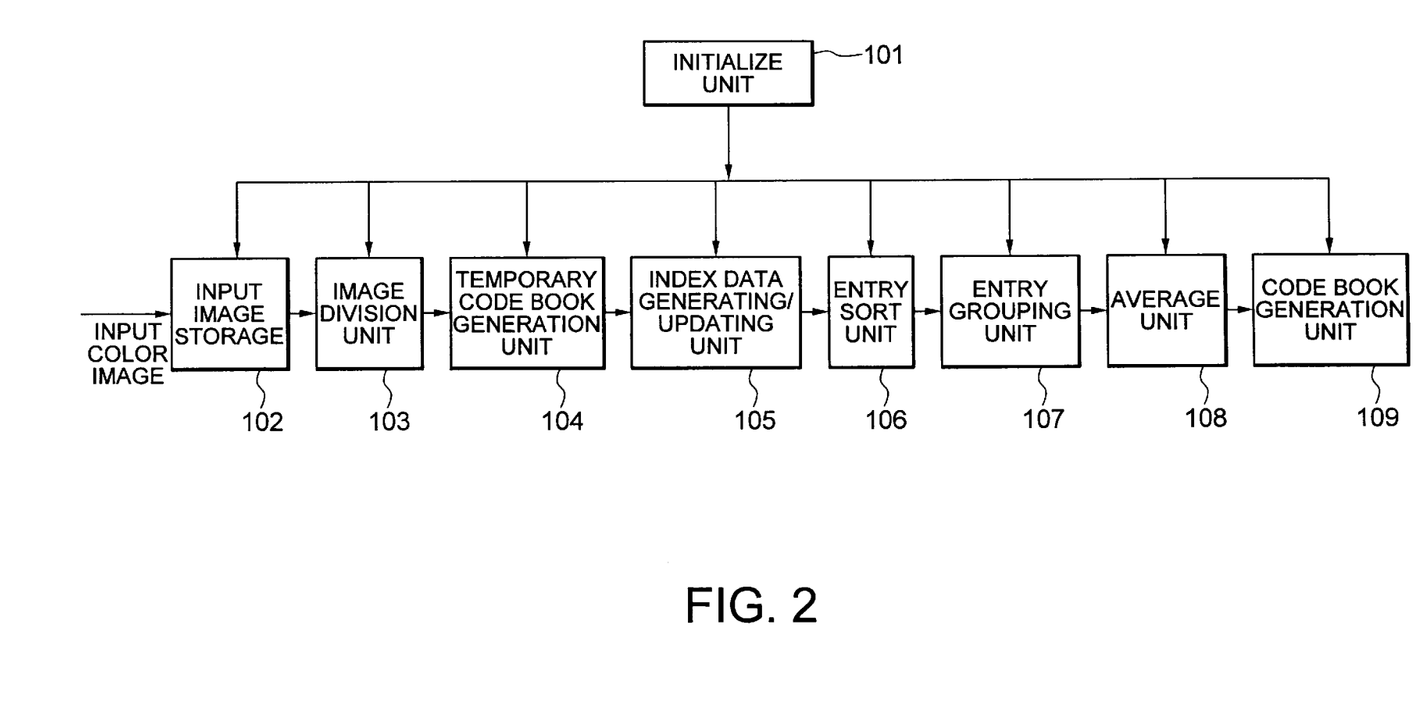
FIG. 2 shows a block diagram of a compression device according to a first embodiment of the invention.

Next, description is made about a compression device according to a first embodiment of the invention with reference to FIG. 2.

The compression device of digital image data shown in FIG. 2 includes an input image storage 102, an image division unit 103, a temporary code book generation unit 104, and an index data generating/updating unit 105.

The input image storage 102 is given an input color image as an array of pixels each of which is represented by a plurality of values for each color component.

Figure 4:
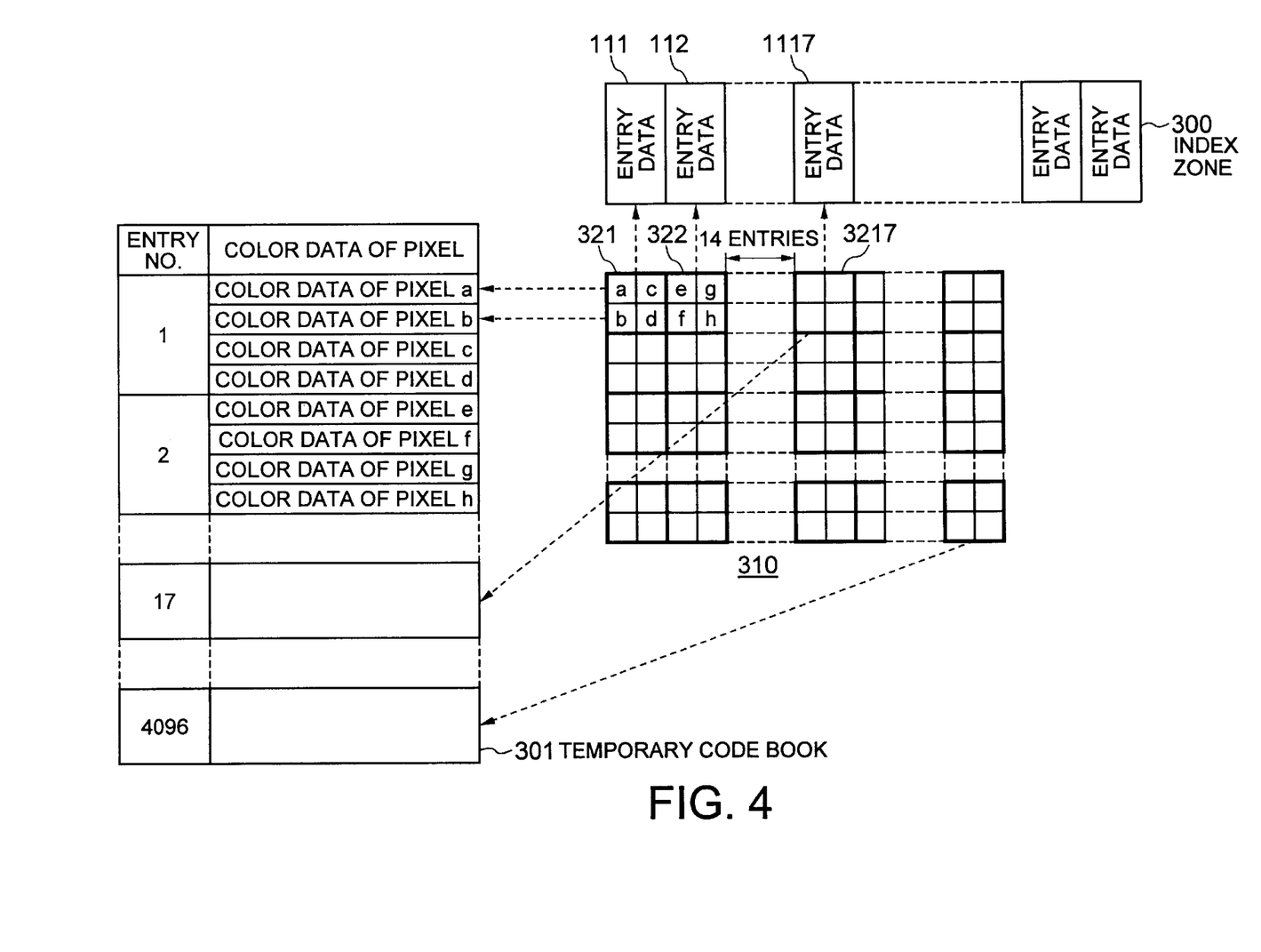
FIG. 4 shows a diagram for use in describing index generating process of steps S2 through S4 shown in FIG. 3.

The image division unit 103 groups a plurality of pixels of the original image data 310 stored in the input image storage 102 into the entries (321, . . . , 3217, . . . ), as shown in FIG. 4.

The temporary code book generation unit 104 generates color data of all pixels in the order of the array of the pixels, and stores them into the temporary code book 301 shown in FIG. 4. The index data generating/updating unit 105 generates an index 300 shown in FIG. 4 and updates the contents, such as location data of entries.

The index zone 300 includes the location data of the entries (111, 112, ... ) and data which are used to determine which entry number of color data in the temporary code book 301 shown in FIG. 4 is used as color data of pixels in the entry. Related description will be made later in more detail.

The compression device of the invention further includes an entry sort unit 106, an entry grouping unit 107, an average unit 108, and a code book generation unit 109.

The entry sort unit 106 computes, for each entry, an entry chrominance which stands for chrominance component of the entry included in each pixel of the entry, and rearranges the entries (111, 112, ... ) in descending order or ascending order of its entry chrominance.

Figure 5:
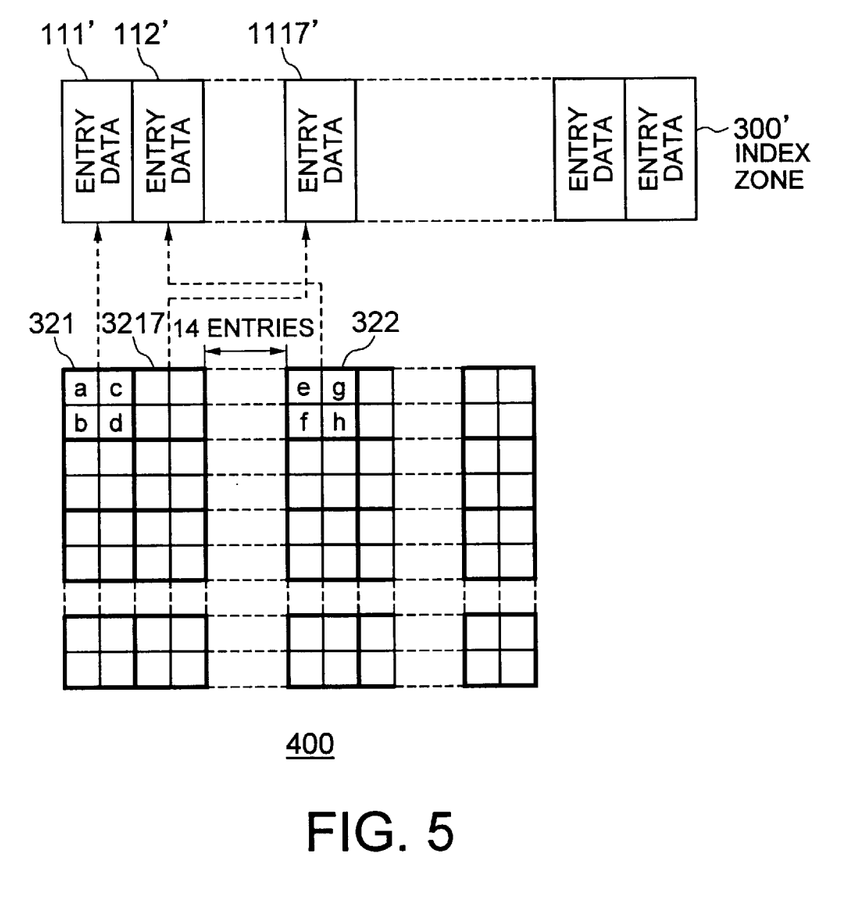
FIG. 5 shows a diagram for use in describing index updating process of steps S5 and S6 shown in FIG. 3.
Figure 6:
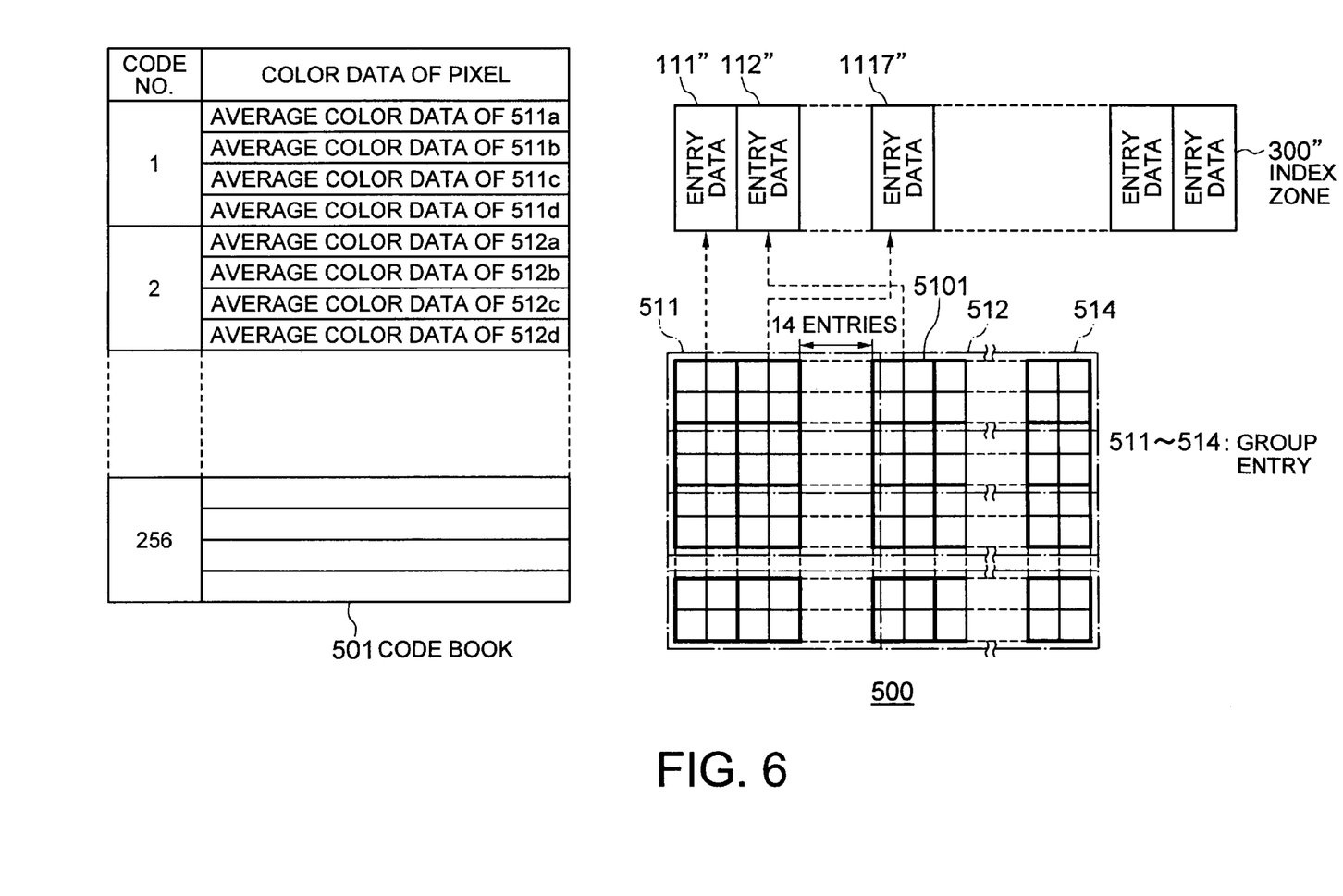
FIG. 6 shows a diagram representing index updating process of steps S7 through S10 shown in FIG. 3.

The entry grouping unit 107 groups an image (shown in FIG. 5) which is rearranged based on the result of the entry sort unit 106 into a plurality of group entries (511, 512, ... ) shown in FIG. 6, each of which includes a plurality of entries.

The average unit 108 averages color data of pixels for each group entry (511, 512, ... ). The code book generation unit 109 generates a code book 501 shown in FIG. 6. Herein, the code book 501 stores a plurality of averaged color data which are averaged for each group entry (511, 512, ... ).

The index data generating/updating unit 105 updates data of original entries (111, 112, ... ) as shown in FIG. 4 into data of entries (111', 112', ... ) rearranged by the entry sort unit 106 as shown in FIG. 5.

As illustrated in FIG. 2, the compression device of the invention includes an initialize unit 101 which provides a division number of unit used by the image division unit 103, the number of entries in a group entry, the number of the entries in the code book, and the like.

Figure 3:
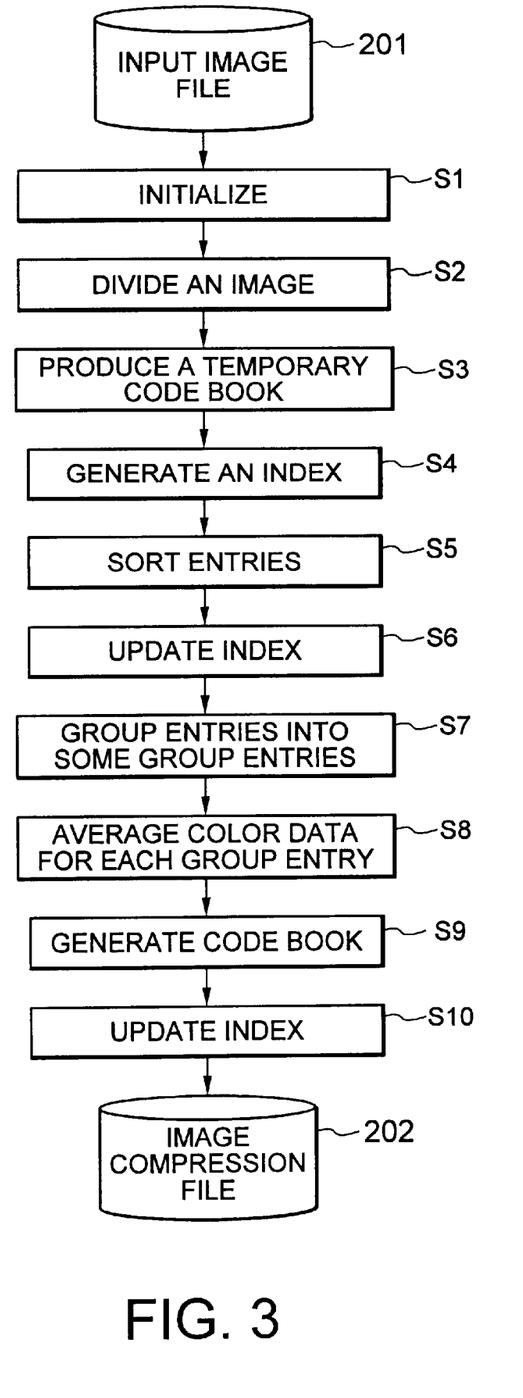
FIG. 3 shows a flowchart for use in describing a method of compressing digital image data using the compression device shown in FIG. 2.

Next, description is made in more detail about a compression method of the invention using the above mentioned compressing device with reference to the flowchart of FIG. 3.

Firstly, at step S1, digital image data stored in an input image file 201 are read out, and the number of pixels in an entry and the number of entries in a group entry are initialized. Hereinafter, it is assumed that the digital image data consist of 128 pixels by 128 pixels, each entry includes two pixels by two pixels, and the number of entries in the code book is equal to 256.

At step S2, the method divides the original image data 310 (FIG. 4) into a plurality of entries. Each entry is composed of a plurality of pixels. As a result, each entry includes a plurality of pixels. In the example illustrated in FIG. 4, the original image data 310 is divided into entries (321, 322, 3217, ... ) each of which includes four pixels. The original image data 310 are divided and arranged into sixty-four (64) entries along a horizontal direction in FIG. 4 and are also divided into 64 entries along a vertical direction. On the whole, the illustrated image data are grouped into 4,096 entries (64×64). The entry 321 consists of pixels a, b, c, and d and, similarly, the entry 322 consists of pixels e, f, g, and h.

Then, at step S3 in FIG. 3, a temporary code book 301 which stores color data of the entries (321, 322, ... ) is generated or produced in a manner as shown in FIG. 4. That is, the color data of the entry 321 (pixels a to d) are stored one after another into an area (corresponding to entry number "1") in the temporary code book 301. Similarly, the color data of the entry 3217 which belong to seventeenth (17-th) entry from the entry located in the top left side are stored into an area corresponding to entry number "17". The above process is repeated for all of the 4,096 entries.

A volume of thus generated temporary code book 301 is very large since all of the color data of the entries must be included in the temporary code book 301. But, because the contents of the temporary code book 301 are finally discarded, the volume of the temporary code book 301 is irrespective of a volume of compressed image data.

Next, at step S4, an index is generated which is used for decompressing of an image. Referring to FIG. 4, the index zone 300 includes entry data (111, 112, ... ). Each of the entry data includes an entry number of an area in which the color data of the entry are stored together with location data of the entry.

That is, the location data of the entry 321 and entry number "1" (color data of the entry 321 are included in the temporary code book 301 and the area in which the color data are stored is related to entry number "1") are stored in the index zone 300 as entry data 111. Similarly, the location data of the entry 3217 and entry number 17 are stored in the index zone 300 as entry data 1117.

At step S5 illustrated in FIG. 3, an entry chrominance for each entry is calculated by using color data of the pixels in the entry. And the entries are rearranged based on the entry chrominance and an image is produced using the rearranged entries.

Specifically, the entry chrominance is computed by using three values or components of pixels in the entry as representative color information of the entry. Three values corresponds to color components R (red), G (green), and B (blue) of the pixel, and each value may vary 0 to 255.

For example, let a value of the color component R be determined by summing up or averaging values of the color component R of pixels in the entry. Also, by summing up or averaging each difference values between the value of the color component R and a predetermined value (or a value of color component of a pixel), the value of the color component R is obtained.

Similarly, a value of the color component G and a value of the component B are determined.

Thus, values of the color components are calculated and determined along with a value of the entry chrominance related to one entry.

For example, the value of the entry chrominance is determined by selecting anyone of the three values related to color components R, G, and B, or by averaging the three values.

Consequently, the entry chrominance is obtained as one value representing color data of the entry and the entries are rearranged in descending or ascending order of the entry chrominance.

As described above, the entries are sorted based on a single value, but a plurality of values may be used to sort the entries.

For example, when the rearrangement (sort) of the entry is performed, a predominant color is selected from color data of R, G, and B, and the value of color component corresponding to the predominant color is used to sort as a first sort key. Values of the other color components are used as a second or a third sort key.

Specifically, when a blue sky with a partial white cloud is displayed in the image, color data of blue (B) is used to be rearranged. In a rearranged image 400 shown in FIG. 5, colors of four pixels of the top left entry are all blue and colors of four pixels of the bottom right entry are all white.

When a field of grass is displayed in most part of the image, color data of green (G) is used to be rearranged. Also, when a field of grass is displayed in a lower side of the image and a blue sky is displayed in a upper side of the image, the color data of blue (B) is firstly used as the color data and then the color data of green (G) is used as the color data to achieve entry sort.

In this case, entries are rearranged in the order of the magnitude of color data of blue (B) in an upper side of the rearranged image, and entries are rearranged in the order of the magnitude of color data of green (G) in a lower side of the rearranged image. Generally, color data of R, G, and B are used to be rearranged three times.

Referring to FIGS. 4 and 5, when it is assumed that, in FIG. 4, the magnitude of the color data of the entry 321 is the largest, the magnitude of the entry 3217 is the second, and that of the entry 322 is the 17-th, the entry 321 in the image 400 is not moved while the entry 322 is moved to the 17-th entry location in direction of rightward from the entry 321, and the entry 3217 is moved to the right adjacent entry location of the entry 321.

Next, at step S6, the index is updated so as to reflect a result of entry sort of step S5. Specifically, referring to FIGS. 4 and 5, the index zone 300 is updated to the index zone 300' by executing entry sort of step S5. As a result, the entry data (111, 112, . . . ) are updated to the entry data (111', 112', . . . ). That is, the contents of the entry data 111' are equal to the contents of the entry data 111, the contents of the entry data 112' are equal to the contents of the entry data 1117, and the contents of the entry data 1117' are equal to the contents of the entry data 112.

Then, at step S7, the number of entries in an group entry which is initialized at step S1 is read out, and the image which the entry sort is processed is grouped into a plurality of group entries.

Herein, the number of entries in a group entry is given by the following equation (1).

[the number of pixels in horizontal direction]×[the number of pixels in vertical direction]/[[the number of pixels in an entry]× [the number of entries in the code book]]   (1)

Since both of the number of pixels in horizontal direction and the number of pixels in vertical direction are set to 128, the number of pixels in an entry is set to four, and the number of entries in the code book is set to 256 at initializing state (step S1), it is determined that the number of entries in a group entry is 16 by substituting these values for the above equation (1).

At step S7, the entries (321, 3217, . . . ) shown in FIG. 5 are gathered into one group entry, and a group entry 511 is produced as shown in FIG. 6. Similarly, the entries (322, . . . ) are gathered into another group entry, and a group entry 512 is produced. As a result, all of group entries (511, 512, . . . ) form an image 500.

Next, at step S8, average color data is generated by averaging color data of pixels in a group entry for each group entry.

Figure 7:
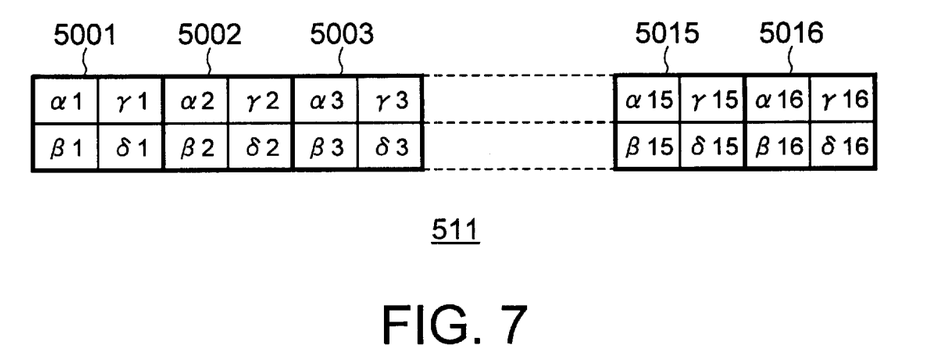
FIG. 7 shows a diagram representing a method of computing average color data of group entry 511 on the basis of color data in entries 5001 through 5016.

The group entry 511 shown in FIG. 6 consists of 16 entries (5001, . . . , 5016) as shown in FIG. 7. Herein, it is assumed that color data of four pixels in each entry 50*j* (j=01 to 16) are each denoted by α*j*, β*j*, γ*j*, and δ*j* while average color data 511*a* of the top left pixel in each entry are determined by computing the equation (α1+α2+ . . . +α16)/16. Similarly, average color data 511*b* of the bottom left pixel in each entry are determined by computing the equation (⊕1+β2+ . . . +β16)/16, average color data 511*c* of the top right pixel in each entry are determined by computing the equation (γ1+ γ2+ . . . +γ16)/16, and average color data 511*d* of the bottom right pixel in each entry are determined by computing the equation (δ1+δ2+ . . . +δ16)/16.

The above averaging process is repeated for 256 group entries (511, 512, . . . ).

Next, at step S9, the code book is generated to decompress the original image from the coded image data.

Referring to FIG. 6, each pixel in the group entry 511 corresponds to one of pixels in the entries (321, 3217, . . . ), and has the same average color data. The average color data 511*a* to 511*d* are stored into an area of code number "1" in the code book 501.

Similarly, average color data 512*a* to 512*d* of the group entry 512 are stored an area of code number "2" in the code book 501, and the storing process is repeated for the 256 group entries.

Next, at step S10, the index is updated based on the contents of the code book generated at step S9.

Referring to FIGS. 6 and 7, entry data 111" of the first entry 5001 in the group entry 511 are updated, to change a reference address to the code book on the basis of the entry data 111', to refer to each average color data of the code number one in the code book 501. Entry data 112" of the second entry 5002 in the group entry 511 are updated, to change a reference address of the code book on the basis of the entry data 112', to refer to each average color data of the code number one in the code book 501, since the entry 5002 belongs to the same group entry as the entry 5001.

Also, entry data 1117" of the first entry 5101 in the group entry 512 are updated, to change a reference address of the code book on the basis of the entry data 1117', to refer to each average color data of the code number "2" in the code book 501.

As described above, entry data (111", 112", . . . ) of the 4,092 of entries are updated to change a reference address of the code book on the basis of the entry data (111', 112', . . . ) so as to refer to each average color data of the code numbers "1" to "256" in the code book 501. As a result, the index zone 300' is updated to the index zone 300", and the code book 501 and the index zone 300" are stored into an image compression file 202 as compressed image data.

In the compression method of the invention, the entries including pixels composed of similar color data can be located at near or close positions by dividing an image into a plurality of entries and thereafter by rearranging the entries on the basis of color data of each pixel in the entries.

Therefore, it is possible to improve degradation of image quality in decompressing original image by averaging color data in adjacent entries after entry sort, and by generating the code book on the basis of the averaged color data.

Figure 8A:
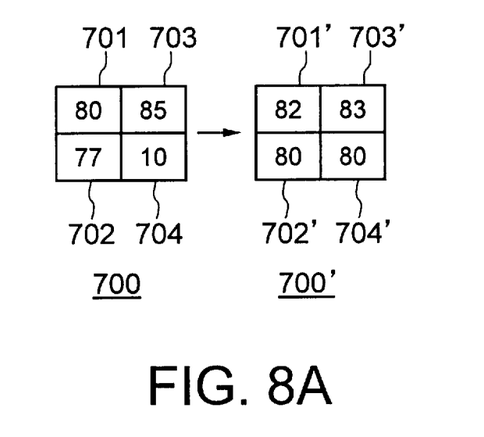
FIGS. 8A and 8B show diagrams comparatively representing a previous compressing method and a compressing method of the invention.
Figure 8B:
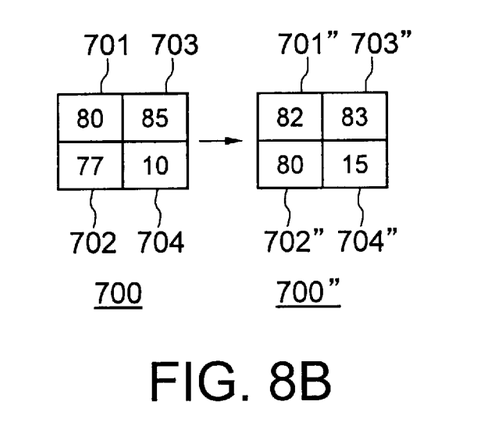

Description is made in more detail about the above effects with reference to FIGS. 8A and 8B.

In FIG. 8A, an entry 700 is shown which includes pixels 701 to 704 each of which is represented by eight bits (0 to 255) color data. The color data of pixels 701, 702, 703, and 704 are represented by 80, 77, 85, and 10, respectively.

The previous or prior method using vector quantization executes pattern matching between the color data of each pixel in the entry 700 and the color data of the code book. Further, the previous method selects, for each pixel in the entry 700, color data pattern which is the closest to the color data of the pixel in the entry 700 from the color data in the code book to consider the color data pattern as the color data of the pixel in the entry 700.

As a result, when it is assumed that color data of each pixel (701', 702', 703', and 704', which correspond to pixels 701 to 704) in a decompressed image are considered as color data 82, 83, 80, and 80, respectively, color data 10 of the pixel 704 may be drastically changed to color data 80, thereby an image quality of the pixel 704 (704') is degraded.

On the other hand, the method of the invention is capable of decreasing a degradation of color data, since color data of pixels in an entry are averaged for each group entry. For example, as shown in FIG. 8B, the color data 10 of the pixel 704 are changed to the color data 15.

Next, description is made about a compression device and a compression method of digital image data according to a second embodiment of the invention.

In general, there are image areas where a color hardly changes in several adjacent entries and image areas where a color changes for each pixel. For example, in an image of eyes of animal, a color often changes for each pixel. Repeatability of such eyes is extremely important to determine a quality of the whole image. However, the prior compressing method must keep a large mount of storage to store the code book and the index to increase the repeatability of the image area where a color frequently changes.

According to the second embodiment of the invention, the device and the method of compressing digital image data can avoid increasing storage of the whole system and improve a quality of specific image areas, even in the case mentioned above.

Figure 9:
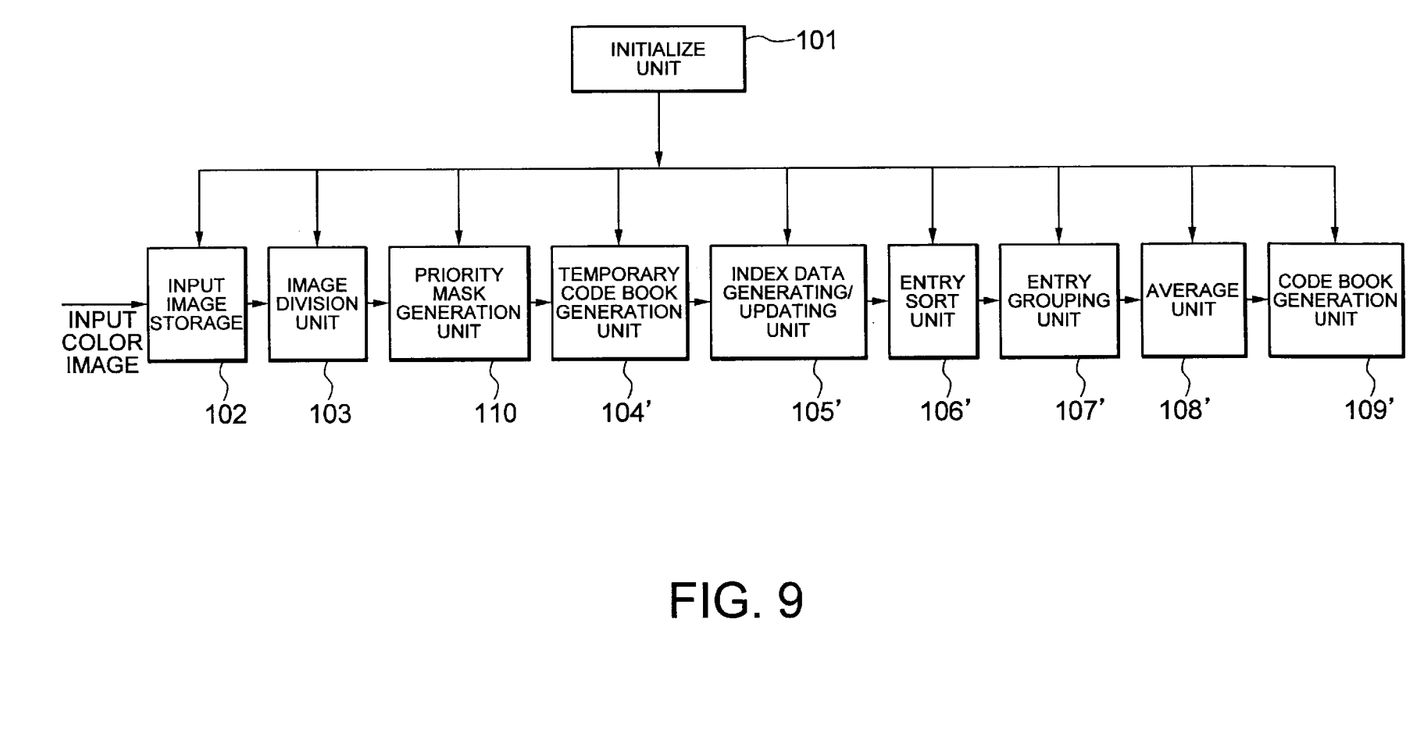
FIG. 9 shows a block diagram of a compression device according to a second embodiment of the invention.

Configuration of the compression device shown in FIG. 9 is substantially similar to the configuration of the device shown in FIG. 2 except that a priority mask generation unit 110 is added to the device of FIG. 2. The priority mask generation unit 110 designates a weight used to average an original image to be compressed for the same number of pixels as that of the original image.

As shown in FIG. 9, the compressing device according to the second embodiment of the invention includes a temporary code book generation unit 104', an index data generating/updating unit 105', an entry sort unit 106', an entry grouping unit 107', an average unit 108', and a code book generation unit 109'.

The temporary code book generation unit 104' generates color data of all pixels and stores them into the temporary code book in the order of array of the pixels. The index data generating/updating unit 105' generates and updates location data and index data of the entries. The entry sort unit 106' rearranges the entries based on the color data of the entries. The entry grouping unit 107' divides an image which is rearranged based on the result of the entry sort unit 106' into entries which priority mask is given and entries which priority mask is not given, and further divides each divided image into group entries each of which consists of an entry or a plurality of entries. The average unit 108' averages color data of pixels in a group entry for each group entry, and the code book generation unit 109' generates the code book.

Next, description is made about the compression method according to the second embodiment of the invention with reference to FIGS. 10, 11A, 11B, 12A, and 12B.

Figure 10:
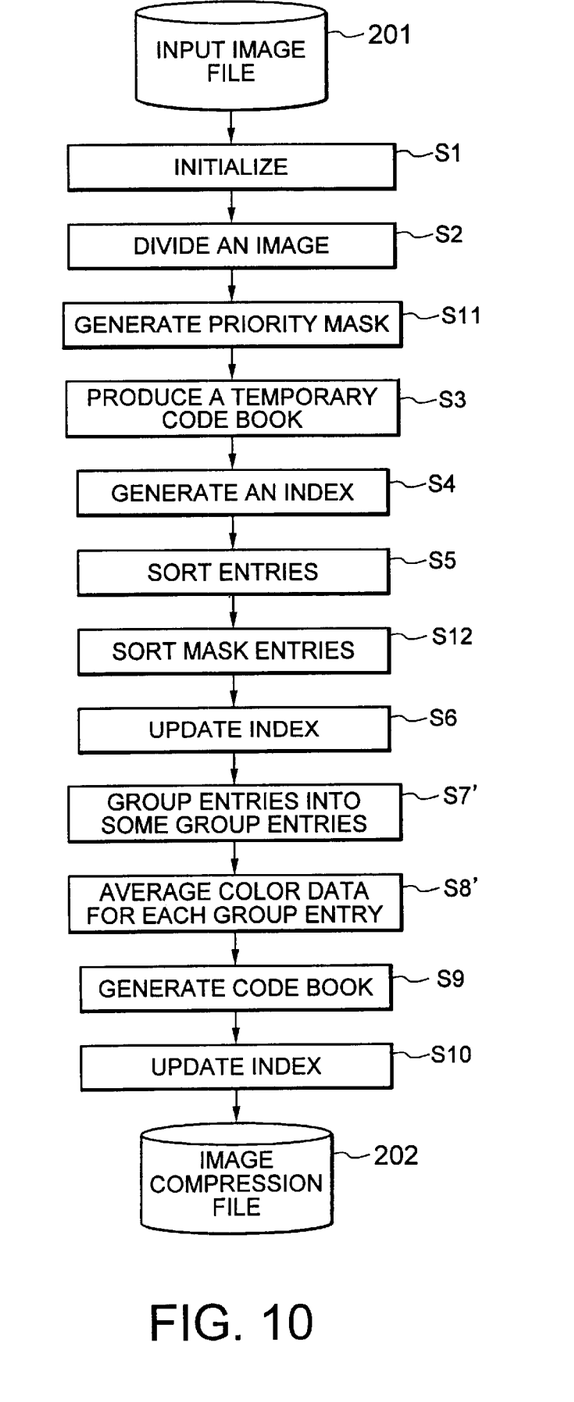
FIG. 10 shows a flowchart representing a method of compressing digital image data using the compression device shown in FIG. 9.
Figure 11A:
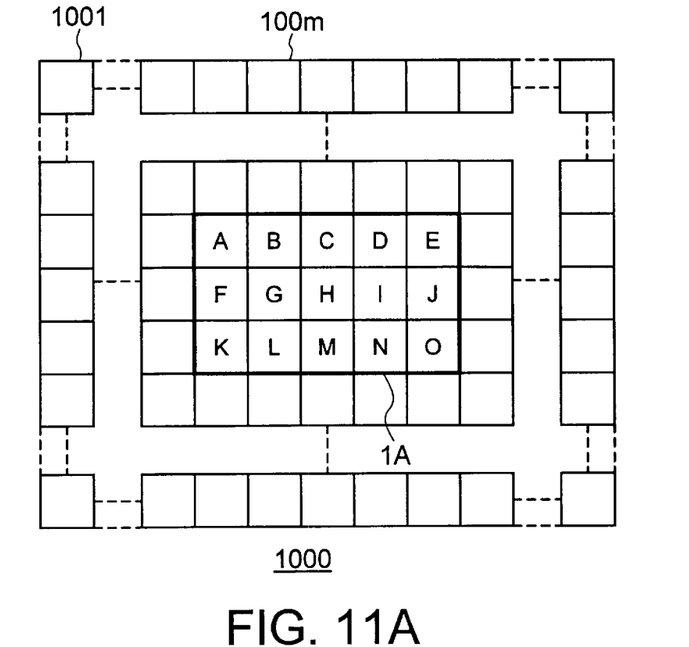
FIG. 11A shows a diagram representing mask generating process of steps S2 and S11 shown in FIG. 10.

In FIG. 10, after initialization at step S1, an original image 1000 is divided into entries (1001, . . . , 100*m*, . . . ) each of which includes four pixels (two pixels by two pixels) at step S2. Referring to FIG. 11A, there is a specific entry area 1A including entries A, B, . . . , and O in the center part of the original image 1000. For example, the specific entry area 1A corresponds to an image area of eyes of an animal.

Figure 11B:
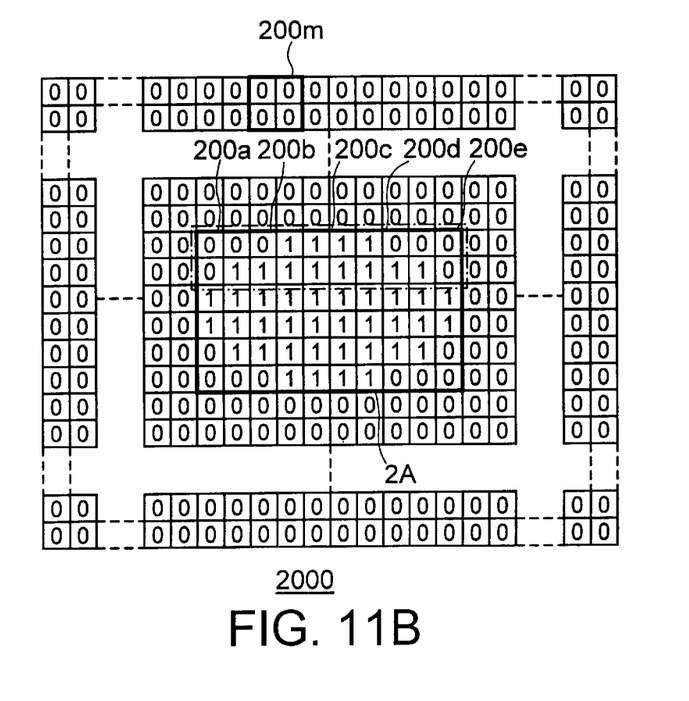
FIG. 11B shows a diagram representing mask generating process of steps S2 and S11 shown in FIG. 10.

At step S11, the priority mask used to give a weight to each pixel is generated. In FIG. 11B, the priority mask 2000 related to the original image shown in FIG. 11A is shown. Herein, the entries (100*m*, A, B. . . . E, . . . ) of the original image 1000 corresponds to mask entries (200*m*, 200*a*, 200*b*, . . . , 200*e*, . . . ). Also, the specific entry area 1A in FIG. 11A corresponds to a specific mask entry area 2A (FIG. 11B) including the mask entries (200*a*, 200*b*, . . . 200*e*, . . . ).

The contents of the mask entry 200*m*, which corresponds to the entry 100*m*, are all set to zero. This means that weighting process is not done for the entry 100*m*. That is, for the entry 100*m*, the averaging process mentioned about the first embodiment of the invention is achieved.

In the mask entry 200*a*, value "0" is set for three pixels and value "1" is set for the remaining pixel. The values "0" and "1" stand for weight values for each pixel in the entry A. In the illustrated example, the value "1" is set to the bottom right pixel in the entry A (not shown), and the value "0" is set to each of the other pixels (not shown) in the entry A. As shown in FIG. 11B, in this example, value "1" is set to a group of pixels which are located in a form of oval shape in the specific mask entry area 2A.

Next, at step S3 in FIG. 10, the temporary code book is produced from the original image 1000, and at step S4, the index is generated as described above.

Figure 12A:
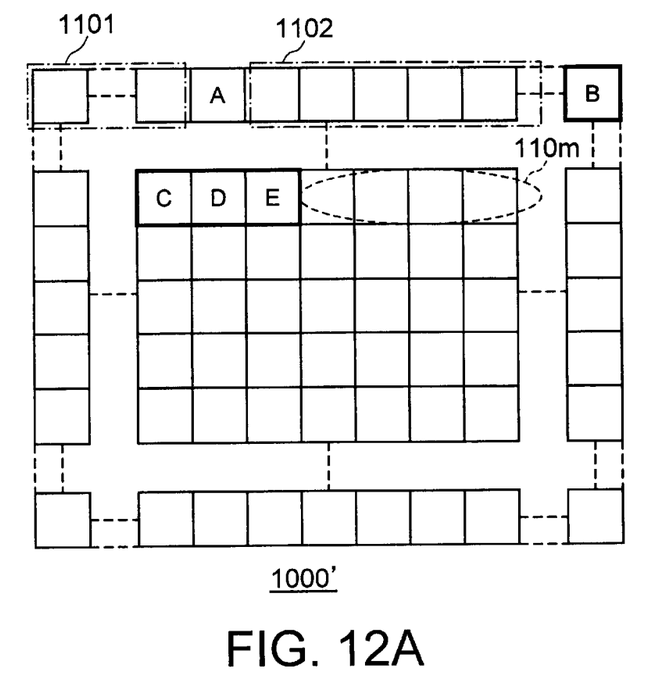
FIG. 12A shows a diagram representing entry grouping process of steps S5 through S7' shown in FIG. 10.

At step S5 that is similar to the first embodiment of the invention, the entries (1001, . . . , 100*m*, . . . , A, B, . . . , O . . . ) in the original image 1000 are rearranged based on color data of the entries. The entries in the original image 1000 shown in FIG. 11A are rearranged as shown in FIG. 12A.

Figure 12B:
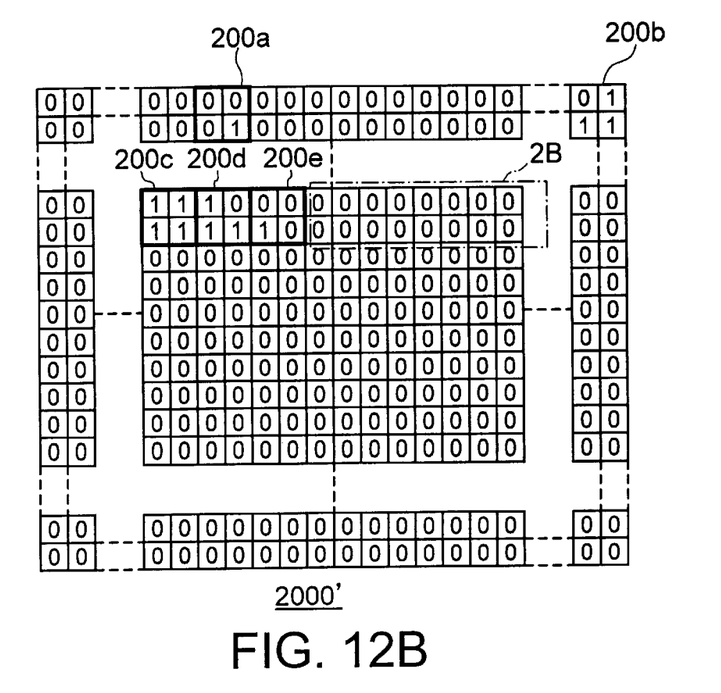
FIG. 12B shows a diagram representing entry grouping process of steps S5 through S7' shown in FIG. 10.

Then, at step S12, the mask entries corresponding to the entries rearranged or sorted at step S5 are sorted. In FIG. 12B, priority mask 2000' is shown which corresponds to an image 1000' which is after entry sort. The mask entries 200*a* to 200*e* are rearranged according to the movement of the entries A to E.

Next, at step S6, the index is updated based on the result of the entry sort at step S5.

At step S7', a plurality of entries are grouped. But, grouping process for entries in a specific entry area where value "1" is given on the priority mask is separately done from grouping process for entries out of the specific entry area. That is, the entries which do not belong to the specific entry area are, as similar to the first embodiment of the invention, grouped using the number of entries calculated by the equation (1). On the other hand, the entries in the specific entry area are grouped using a certain number of entries less than the number of the entries calculated by the equation (1).

In FIG. 12A, each of group entries 1101 and 1102 consists of 16 entries equal in the number calculated using the equation (1), and each of the entries (A, B, . . . , E) in the specific entry area individually forms a group entry.

Figure 13A:
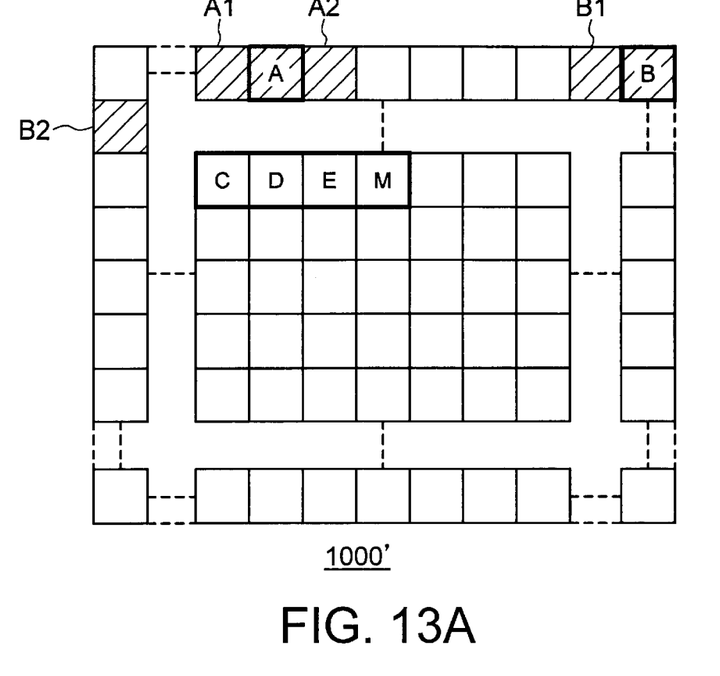
FIG. 13A shows a diagram representing other entry grouping process.

In FIG. 13A, adjacent entries which are located on the right side and the left side to each entries (A, B, . . . , and E) are collectively grouped. For example, an entry A1 located on the left side of an entry A and an entry A2 located on the right side of the entry A are grouped to one group entry. Also, an entry B1 located to the left side of an entry B and an entry B2 located on the next row and on the left end of the row are grouped to one group entry.

Figure 13B:
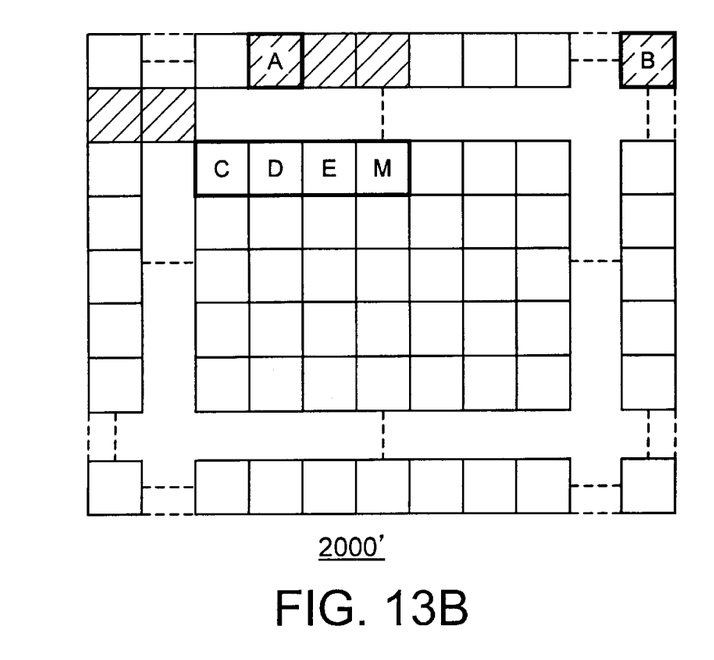
FIG. 13B shows a diagram representing other entry grouping process.

Further, as a method of grouping entries in the specific entry area, as shown in FIG. 13B, two entries following each entry (A, B, . . . , and M) may be grouped to one group entry. In this method, each of entries (C, D, and E), and entries (D, E, and M) may be configured in one group entry.

Also, in the grouping process, if a distance (number of entries) between the first entry or entries in the specific entry area and entries in the other specific entry area is less than the number of entries calculated using the equation (1). For example, if the group entry 1101 shown in FIG. 12A consists of only eight entries, the eight entries are configured as one group entry without being processed.

Next, at step S8', color data are averaged for each group entry. In the first embodiment of the invention, the color data are averaged using the certain number of entries, but in the second embodiment of the invention, the entries in the specific entry area are averaged using less pixel number than that for the entries which does not belong to the specific entry area.

For example, in FIG. 12B, since each of the entries (A, B, . . . , O) constructs a group entry independently, the entries are not averaged and stored into the code book as an image without being processed. Therefore, it is possible to increase resolution of the entries (A, B, . . . , O) although the size of the code book is enlarged a little. Thus, since each of the entries that belongs to the specific entry area is averaged using a small number of pixels, it is possible to improve repeatability of an image of the specific entry area where change of color data is large, such that color changes for each pixel.

Although the value "0" and the value "1" are used as weighting value of the priority mask in the above description, real numbers may be also used. In this case, values are obtained by multiplying the real numbers by color data of the corresponding pixel and the values are averaged for each group entry.

Thereby, entries can be averaged by emphasizing or lightening the weighting values of specific pixels.

Also, in the above description, each pixel has color data of R, G, and B, but other color expressing methods such as a method for monochrome image or a method for gray scale image may be used.

As described above, the compressing method of digital image data of the invention can locate an entry close to another entry including a pixel having a color similar to a pixel of the former entry, since the entries are rearranged, after an image is divided into entries each of which includes a plurality of pixels, in order of its color data using color data of each pixel in the entries. Therefore, the method of the invention can improve a quality of decompressed image by averaging color data of the closely located entries, after the entries are rearranged, and by generating the code book.

Furthermore, the method of the invention can improve repeatability of a specific entry area in which a color changes drastically, for example, a color is different for each pixel, by generating weighting pattern which corresponds to the specific entry area on the priority mask and by averaging the specific entry area using the number of entries less than that of a group entry having smaller weighting value.

What is claimed is:

1. A method of compressing an image including a plurality of pixels, comprising the steps of:
   dividing the plurality of pixels into a plurality of entries;
   computing representative color information of each entry using color information of pixels in the entry, the color information representing a color of the pixel;
   rearranging the entries in order of the representative color information;
   grouping the rearranged entries into a plurality of group entries;
   averaging color information for each group entry by averaging color information of pixels in the group entry;
   storing the average color information for each group entry; and
   storing location information representing an original location of the entry on the image and an address where the average color information corresponding to the entry is stored.

2. The method of claim 1, further comprising the step of:
   giving a first weighting value and a second weighting value to each of the rearranged entries,
   wherein group entry is produced to include a first entry number of entries when the firs weighting value is given to the entry, and group entry is produced to include a second entry number of entries, which is smaller than the first entry number when the second weighting value is given to the entry.

3. The method of claim 2, wherein the first weighting value and the second weighting value are given to each pixel in the rearranged entries;
   the second weighting value is given to an entry when a pixel in the entry exists which is given the second weighting value;
   the first weighting value is given to an entry when the first weighting value is given to all pixels in the entry.

4. The method of claim 2, wherein the second weighting value is given to only one entry to form a group entry by the entry, and averaging is not done for the entry.

5. The method of claim 1, wherein the color information includes values each of which corresponds to either one of color components of a pixel.

6. The method of claim 5, wherein the color components include red, green, and blue.

7. The method of claim 1, wherein the representative color information is color information of a pixel in the entry.

8. The method of claim 1, wherein the representative color information is an average of color information of a plurality of pixels in the entry.

9. The method of claim 5, wherein the representative color information includes a first color component and a second color component;
   the rearrangement of the entries is processed in order of values of the first color component and then the arrangement is processed in order of values of the second color component.

10. The method of claim 1, wherein the grouping step produces each group entry including consecutive entries which are rearranged.

11. A method of decompressing an image including a plurality of pixels, comprising the steps of:
    inputting average color information of each group entry, the group entry includes a plurality of entries each of which includes a plurality of pixels;
    inputting location information representing a location of the entry on the image and an address where the average color information corresponding to the entry is stored;
    reproducing pixels in each entry according to the corresponding average color information which is determined by using the address; and
    location the reproduced pixels on the image based on the location information.

12. A device of compressing an image including a plurality of pixels, comprising:
    an input image storage which inputs the image and stores color information which represents color of pixels of the image;
    an image division unit which divides the plurality of pixels into a plurality of entries;

an entry sort unit which computes representative color information of each entry using the color information of pixels in the entry and rearranges the entries in order of the representative color information;

an entry grouping unit which groups the rearranged entries into a plurality of group entries;

an average unit which averages color information for each group entry by averaging color information of pixels in the group entry;

an average color information storage which stores the average color information for each group entry; and an index which stores location information representing a location of the entry on the image and an address where the average color information corresponding to the entry is stored.

13. The device of claim 12 further comprising:

a priority mask unit which gives a first weighting value and a second weighting value to the arranged entries.

wherein the entry grouping unit produces a first entry number of group entries when the first weighting value is given to the entry, and produces a second entry number, which is smaller than the first entry number, of group entries when the second weighting value is given to the entry.

14. A recording medium readable by a computer, tangibly embodying a program of instructions executable by the computer to perform a method of compressing an image including a plurality of pixels, the method comprising the steps of:

dividing the plurality of pixels into a plurality of entries;

computing representative color information of each entry using color information of pixels in the entry, the color information representing a color of the pixel;

rearranging the entries in order of the representative color information;

grouping the rearranged entries into a plurality of group entries;

averaging color information for each group entry by averaging color information of pixels in the group entry;

storing the average color information for each group entry; and storing location information representing a location of the entry on the image and an address where the average color information corresponding to the entry is stored.

* * * * *